Jan. 29, 1924.

C. J. WEINMAN ET AL 1,482,171

CHANGE MAKING MACHINE

Filed June 6, 1921 6 Sheets-Sheet 4

INVENTORS.
C. J. WEINMAN.
M. T. SCHUSTER.
J. O. CAYLOR.

By Edward Reed

Attorney

Patented Jan. 29, 1924.

1,482,171

UNITED STATES PATENT OFFICE.

CHRISTIAN J. WEINMAN, MARK T. SCHUSTER, AND JAMES O. CAYLOR, OF DAYTON, OHIO.

CHANGE-MAKING MACHINE.

Application filed June 6, 1921. Serial No. 475,267.

*To all whom it may concern:*

Be it known that we, CHRISTIAN J. WEINMAN, MARK T. SCHUSTER, and JAMES O. CAYLOR, citizens of the United States, residing at Dayton, in the county of Montgomery and State of Ohio, have invented certain new and useful Improvements in Change-Making Machines, of which the following is a specification, reference being had therein to the accompanying drawing.

This invention relates to change making machines and the like.

One object of the invention is to provide a machine which will mechanically deliver, without computation on the part of the operator, the correct change for any transaction within its limits.

A further object of the invention is to provide a machine of this kind which will be simple in its construction and positive in its operation.

Other objects of the invention will appear as the device is described in detail.

In the accompanying drawings

In these drawings we have illustrated one embodiment of our invention and have shown the same as comprising a plurality of coin receptacles adapted to contain coins of various denominations and each provided with a coin ejector. The ejectors are actuated by an operating lever, or key, of which there are usually several, each representing a different amount which may be received and for which change is to be made. These keys, or operating levers, are herein referred to as the minuend keys because they represent the amount from which the amount of the sale is to be deducted in the making of the change. Each minuend key is adapted to be connected with the ejectors for the number of coin receptacles of different denominations, the sum of said denominations being equal to the value of the minuend key. The connections between the minuend key and the various ejectors are controlled by operating levers, or sales keys, which represent the value of the sale, that is, the subtrahend, or amount to be deducted from the minuend, and the arrangement is such that when one or more sales keys have been operated each minuend key will be connected with the ejectors of coin receptacles, the sums of the denominations of which are equal to the value of the respective minuend keys less the value of the sales key or keys which have been operated. Consequently, by first operating the sales key or keys corresponding to the amount of the sale and then operating the minuend key corresponding to the sum received and from which change is to be made, the correct change will be delivered from the machine. The minuend keys are preferably normally locked and can be released for operation only by the operation of one of the sales keys, and each sales key is locked in its depressed position until a minuend key has been operated. The device may also be provided with indicators to indicate to the customer the amount of the sale which is being deducted in the making of change and these indicators are controlled by the sales keys. The mechanism for performing these functions may be of various kinds and it will be understood that the particular embodiment of the invention here illustrated has been chosen for the purpose of illustration only.

In that form of the invention here illustrated we have shown the same as comprising a main frame 10 which may be of any suitable character and which serves to support the various operating parts of the mechanism. Mounted on this frame and, in the present instance, arranged along the front portion of the same, are a plurality of coin receptacles each adapted to contain coins of a single denomination, and preferably in the form of vertical tubes 11. A base plate 12 closes the lower end of each coin receptacle and serves to support the coins therein. This base plate is provided with a discharge opening 13 arranged out of line with the receptacle but preferably overlapping the same so that while the base plate will retain the coins in the receptacle it will permit one of said coins to be ejected therefrom with a minimum of movement. The lower end of the coin receptacle, or tube, is spaced above the base plate a distance substantially equal to the thickness of one of the coins which it is adapted to contain and an ejector 14 is slidably mounted on the base plate and has an opening 15 therethrough arranged normally in line with the receptacle and adapted to contain the lowermost coin of the stack of coins contained by the receptacle. The arrangement of the opening in the ejector with relation to the opening 15 in the base plate is such that a relatively short movement of the ejector will bring the two openings into line and permit the coin to be discharged from the ejector through the opening 13 to any suitable point of delivery. In the construction here shown we have employed a single base plate for all of the coin receptacles, that plate being provided with a guideway arranged beneath each receptacle and adapted to receive the ejector 14 therefor. If desired, the coin receptacles may be mounted for movement outwardly beyond the base plate to permit of the coins being discharged therefrom at the end of the day's business and, as here shown, the several receptacles, or tubes, are carried by a supporting structure 17, slidably mounted on the base plate and held in its normal position by pins 18 which extend through openings therein into corresponding openings in the end portions of the base plate. Levers 19 are pivotally mounted on the supporting structure 17 and connected with the pins 18, and have their outer ends arranged for convenient operation, so that by manipulating the two levers the supporting structure may be released and the several receptacles moved into a position to permit of the coins being discharged therefrom. The coins which are discharged through the openings 13 in the base plate may be delivered to any suitable point and, as here shown, we have secured to the lower side of the base plate a chute 20 into which the several coins are dropped and which may be arranged to convey them to a common point of delivery.

The ejectors for the several receptacles are operated by the minuend keys, that is, the keys representing the amount which has been received and for which change is to be made, and an individual connecting device is provided for connecting each ejector with the several minuend keys. In the particular device here illustrated, we have shown six minuend keys representing the sums of five cents, ten cents, twenty-five cents, fifty cents, one dollar and two dollars, the present machine being limited in its capacity to a two dollar minuend. It will be understood, however, that any suitable number of minuend keys may be provided and we wish it to be understood that the term coin, as herein employed, is used in a broad sense and in a machine provided with facilities for handling paper money, each piece of such paper money would be the equivalent of a coin of the present machine. Preferably, each minuend key is in the form of an operating lever 21, pivotally mounted between its ends on a shaft 22 mounted in the end members of the main frame. The devices for connecting the minuend keys with the several ejectors may take various forms but, in the present instance, we have shown each ejector 14 as provided with an elongated extension 23 slidably mounted on suitable guide ways in the machine and having mounted thereon a connecting plate, or finger, 24, the forward end of which is adapted to be moved toward and from the extension 23 of the ejector, the finger being preferably pivoted to the extension on a horizontal axis near its rear end. Pivotally mounted on the shaft 22 are a series of actuating devices, or arms, 25 the lower ends of which are so arranged with relation to the respective connecting fingers 24 that when these fingers lie adjacent to the extensions 23 the actuating device will pass above the same, but when the forward ends of the fingers are raised above the extension 23 they will lie in the paths of the actuating devices and the movement of these devices about the axis of the shaft 22 will cause sliding movement to be imparted to the ejectors, the lower end of each actuating arm being preferably provided with a notch 26 to receive the end of the connecting finger 24 and hold the two parts in operative relation.

Figure 1:
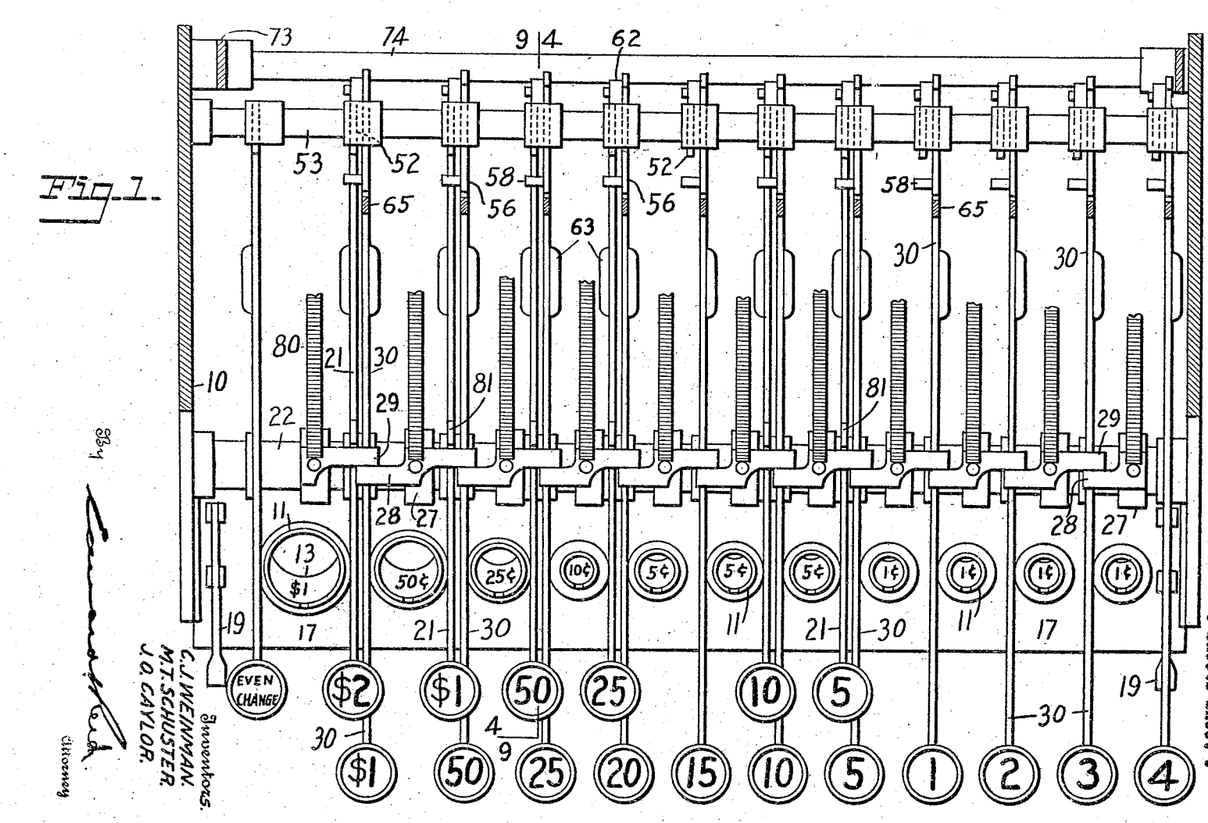
Fig. 1 is a horizontal section taken on the line 1—1 of Fig. 3 showing the operating mechanism in plan.

Each minuend key is adapted to be connected with a plurality of coin receptacles the total of the denominations of which will equal the value of that minuend key. The number and denomination of the coin receptacles may be varied but we have found that the arrangement here shown is well adapted for the convenient making of change in the present machine, and, we have, therefore, shown the present machine as having a single coin receptacle each for dollars, half dollars, quarters and dimes, three receptacles for nickels and four receptacles for pennies. With this arrangement of the coin receptacles, the dollar minuend key is adapted to be connected with the ejectors for the half dollar, quarter, and dime, and three nickel ejectors; and the half dollar minuend key is adapted to be connected with the quarter, dime and three nickel ejectors, but in the operation of the device the minuend key is not connected with all of the ejectors with which it is adapted to be connected, but connection is established only with those ejectors the operation of which is necessary to deliver the required change. In order that each minuend key may operate the actuating devices 25 for all the ejectors with which it is adapted to be connected and that the minuend keys of lower denomination may be operated to impart movement to the actuating devices for the ejectors with which they are adapted to be connected without causing the operation of ejectors which are operated only by minuend keys of higher denominations, we have provided means for connecting each actuating device 25 with the actuating device of the next lower denomination so that the two actuating devices will move in unison when movement is imparted to the one of higher denomination, but this connection is such that the actuating device of lower denomination may be operated independently of the one of higher denomination. To this end each actuating device 25 has secured thereto, above the shaft 22, laterally extending projections extending lengthwise of the shaft 22 on opposite sides of the actuating device, with the exception of the actuators at the extreme ends of the shaft, which actuators are provided with projections only on that side adjacent to the other actuating devices. By reference to Fig. 1 it will be noted that each actuating device comprises a hub 27 and that each hub, with the exception of the one at the left hand end of the shaft is provided with a projection 28 extending laterally therefrom and that each hub with the exception of the last one at the right hand end of the shaft is provided with a projection 29 extending laterally therefrom and arranged in the rear of and overlapping the adjacent end of the projection 28 of that actuating device lying adjacent to it on its right hand side. Consequently, the operation of any one of the actuating devices will cause all the actuating devices lying on the right hand side of the one to which movement is imparted to be actuated but those actuating devices lying on the left hand side of the one to which movement is imparted will not be operated. The actuating devices are held normally in their retracted positions by means of springs 80 connected therewith above the shaft. Each minuend key is provided on its hub with an upwardly extending projection 81 arranged to engage one of the projections on the actuating device with which it is associated and thus impart operative movement to that actuating device when that particular minuend key is operated.

Figures 3, 4:
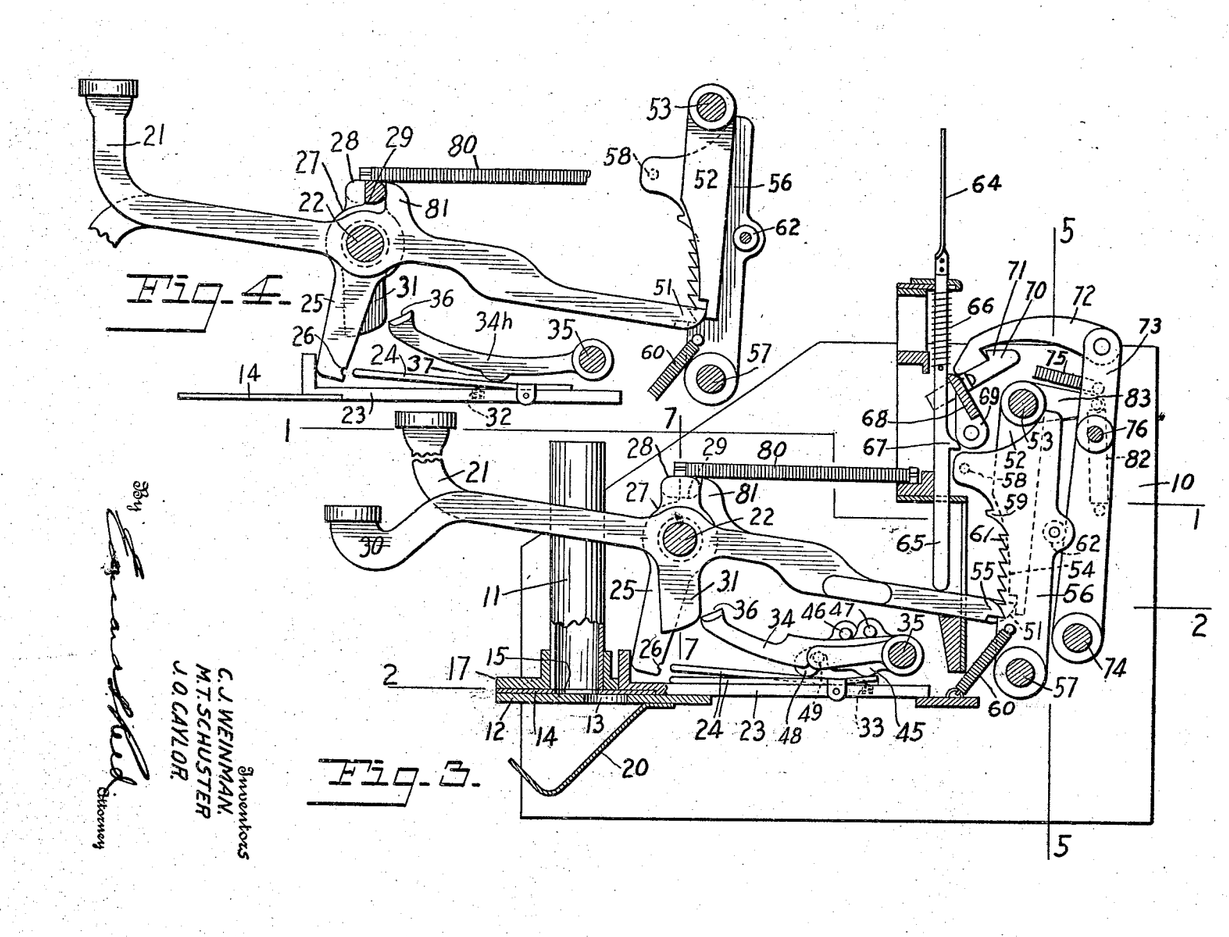
Fig. 3 is a vertical section taken on the line 3—3 of Fig. 2.
Fig. 4 is a sectional view taken on the line 4—4 of Fig. 1, partly broken away.
Figure 9:
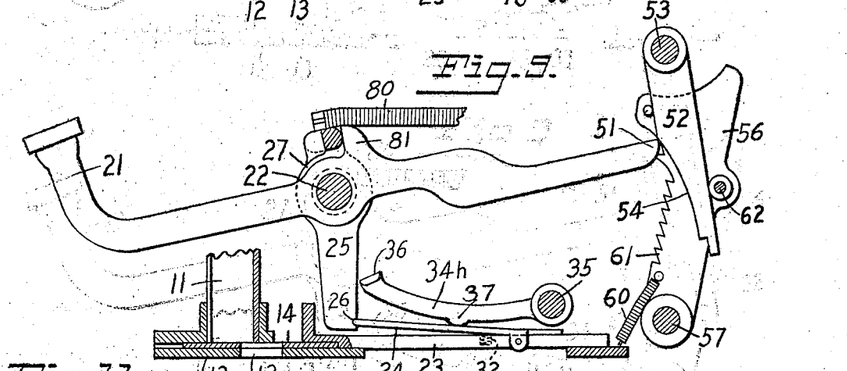
Fig. 9 is a section taken on the line 9—9 of Fig. 1.
Figure 11:
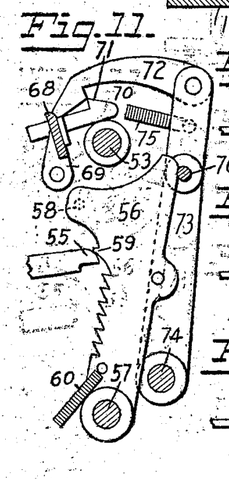
Fig. 11 is a detail view of the releasing mechanism for the indicators.

As has been stated, the connections between the minuend keys and the several actuating devices are controlled by sales keys and these sales keys are here shown in the form of operating levers 30 journaled on the shaft 22 and, in the present instance, each sales key has depending from its hub a projection 31 having a cam shaped lower end. In the present machine, it will be noted that coin receptacles are provided in sufficient number and of the proper denomination to make change in multiples of five cents without the use of pennies, this being accomplished by providing one dime and three nickle receptacles. To take care of sales involving fractions of a nickel, that is, odd cents, we have provided four penny receptacles. In the preferred form of the machine, which is here shown, the connecting fingers 24 for the nickel ejectors, or those of higher denomination, are normally elevated into positions in the paths of the respective actuating devices 25, thereby establishing a normal connection between these ejectors and their actuating devices. This may be accomplished by arranging a spring 32 below each finger 24 in front of its axis. Inasmuch as the penny ejectors are operated only when the sale includes odd cents, the connecting fingers 24 for these ejectors are preferably arranged normally in inoperative positions, that is, adjacent to the extensions 23 of the respective ejectors so that they will not be engaged by their actuating devices and, consequently, the penny ejectors will be normally disconnected from the minuend keys. To accomplish this a spring 33 may be interposed between the connecting finger 24 of each penny ejector in the rear of its axis, as shown in Fig. 3. To cause the minuend keys to be connected with the proper ejectors means have been provided, under the control of the sales keys, for rendering inoperative the connections between the minuend keys and the ejectors for coins the total value of which is equal to the sale made, if this sale is a multiple of five cents. If the sale includes odd cents the sales keys will disconnect from the minuend keys ejectors for coins of a total value equal to the sale plus an additional five cents and will then connect with the minuend keys penny ejectors of a value equal to the difference between five cents and the odd cents involved in the sale. It will be noted that the arrangement of the sales keys is such that any given sale of less than a dollar can be deducted from the amount received. To this end we have provided four penny sales keys, the four penny sales keys and sales keys of five cents, ten cents, fifteen cents, twenty cents, twenty-five cents and fifty cents and one dollar denomination. It will be noted that the highest numbered penny sales key is at the extreme right of the machine. This is due to the fact that a sale involving four cents requires the ejection of one penny and, consequently, the depression of the four cent sales key causes the ejection of the smallest amount possible. Cooperating with each of these sales keys is a controlling lever 34, the several levers being journaled on a shaft 35 arranged near the rear ends of the extensions 23 of the ejectors and each having a transverse head 36 arranged in the path of the cam shaped end of the arm 31 carried by the corresponding sales key. Each of these controlling levers is provided with means to move at least one of the connecting fingers 24 from its normal position. As has been stated, there is one of these levers for each sales key and they are herein indicated by the reference numerals 34 to 34$^j$. Because of the different combinations which must be effected in making the change certain of these levers act upon the fingers in different ways. The controlling levers for the dollar, one-half dollar, and quarter sales keys act directly upon the connecting fingers 24 for the respective coin receptacles and as shown in Figs. 4 and 9, each such lever has a cam surface 37 arranged to bear upon its connecting finger in front of the axis of the latter so that the operation of the sales key for any one of these denominations will cause the connection between the minuend key and the ejector of that particular denomination to be rendered inoperative.

Figure 12:
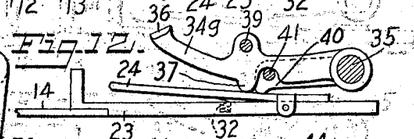
Figs. 12, 13 and 14 are detail views of the devices for controlling the connection between the minuend keys and the coin ejectors.
Figure 13:
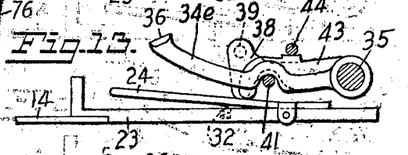
Figure 14:
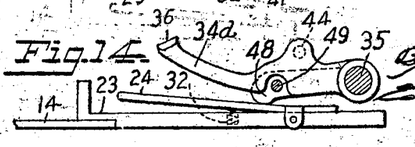

The controlling lever 34$^g$ for the twenty cent sales key, as shown in Fig. 12, is likewise provided with a cam surface 37 to depress the connecting finger 24 of the dime ejector but it is also provided with means for connecting the same with the controlling levers for two of the nickel ejectors. The controlling lever for the first nickel ejector, that is, the one adjacent to the dime ejector is similar to the controlling lever for the dime ejector but the controlling lever for the second nickel ejector, as shown in Fig. 13, does not act directly upon the connecting finger 24 but this finger is actuated by a supplemental controlling lever 38, which is also pivoted on the shaft 35 and which, in the present instance, is connected with the controlling lever 34$^g$ for the dime ejector by means of a rod 39, which not only causes the levers 34$^g$ and 38 to move in unison but extends above the controlling lever 34$^f$ for the first nickel ejector and actuates the same in unison with the movement of the levers 34$^g$ and 38. Thus it will be seen that upon the operation of the twenty cent sales key three controlling levers will be actuated and the dime and two nickel ejectors will be disconnected from the minuend key, leaving one nickel ejector connected therewith. Consequently, if the quarter minuend key is actuated five cents in change will be discharged; if the dollar minuend key is actuated a half dollar, a quarter and a nickel will be discharged.

Figure 2:
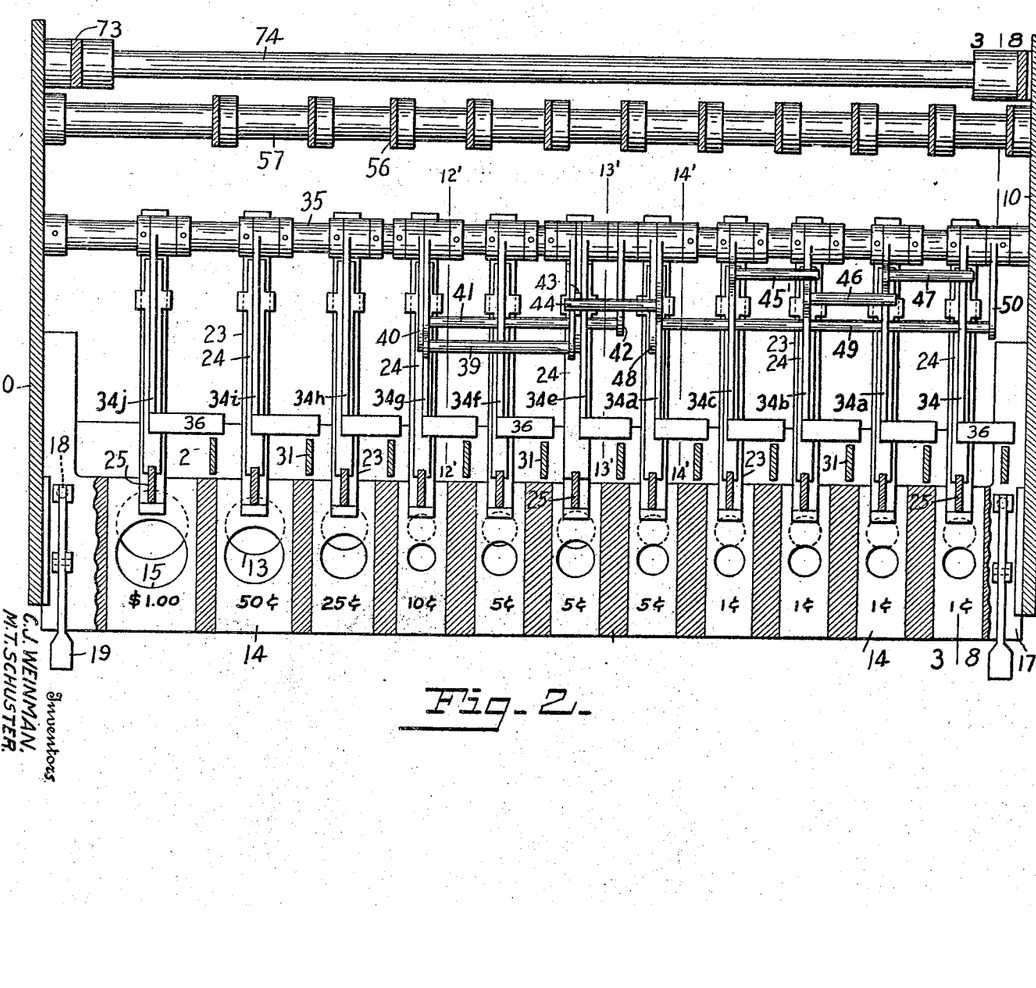
Fig. 2 is a horizontal sectional view taken on the line 2—2 of Fig. 3.

The fifteen cent sales key acts directly upon the controlling lever 34$^f$ of the first nickel ejector but means are provided whereby the operation of the controlling lever 34$^f$ will also cause the connecting finger 24 for the dime ejector to be depressed. To this end we have provided a supplemental controlling lever 40, see Figs. 2 and 12, arranged alongside of the main controlling lever 34$^g$ and also acting upon the finger 24 of the dime ejector. A bar 41 is mounted on the supplemental lever 40 and extends beneath the controlling levers 34$^g$, 34$^f$ and 34$^e$ and is supported at its opposite end in an idle arm 42 pivotally mounted on the shaft 35 between the controlling levers 34$^e$ and 34$^d$. It will be apparent, therefore, that the downward movement of the controlling lever 34$^f$ will carry with it the bar 41 and the supplemental actuating lever 40, thus disconnecting the dime ejector and one nickel ejector.

The ten cent sales key acts directly upon the controlling lever 34$^e$, see Fig. 13, but it will be noted that this controlling lever, while mounted adjacent to the second nickel ejector, does not act upon the connecting finger for that ejector but is connected with the supplemental controlling lever 40 for the dime ejector. As above noted, the bar 41 which is connected with the supplemental finger 40 extends beneath the controlling finger 34$^e$ and is, therefore, depressed thereby. Consequently, the operation of the ten cent sales key will disconnect the dime ejector from the minuend keys and if the quarter minuend key is operated three nickels will be discharged.

The five cent sales key acts upon the controlling lever 34$^d$ arranged above the third, or right hand, nickel ejector, but in the present construction this controlling lever actuates the connecting finger 24 for the second nickel ejector and to this end it carries a laterally extending pin, or bar, 44, which engages the upper edge of a supplemental controlling lever 43, arranged between the controlling levers 34$^e$ and 38, thus causing a single nickel ejector to be disconnected from the minuend key upon the operation of the five cent sales key.

Figures 8, 10:
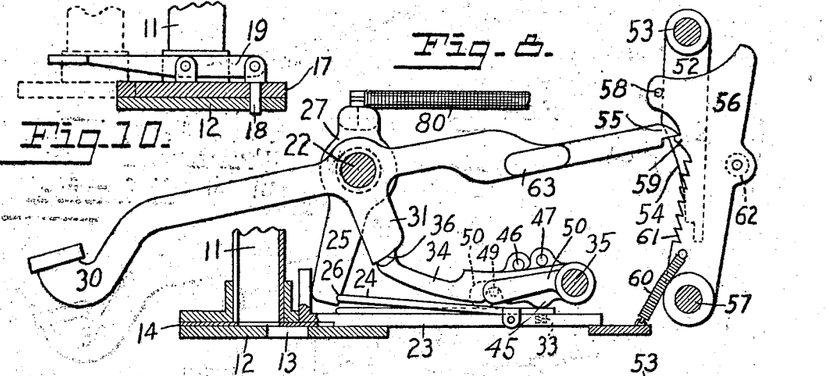
Fig. 8 is a transverse sectional view taken on the line 8—8 of Fig. 2.
Fig. 10 is a sectional detail view showing the lock for the base of the coin receptacles.

When the sale involves odd pennies it is necessary that one five cent ejector be disconnected and the proper number of penny ejectors connected with the minuend key. As shown in Figs. 3 and 8, the controlling lever 34 for the right hand, or last, penny ejector has a cam surface 45 which engages the connecting finger 24 in the rear of its axis, thereby raising the front end of the finger and establishing an operative connection between the same and its actuating device. The controlling levers 34ª, 34ᵇ and 34ᶜ for the other penny ejectors are similar to the lever 34. When the one cent sales key is depressed, it will act upon the controlling lever 34ᶜ to render that ejector operative but inasmuch as four pennies must be returned in change it is necessary that all four of the penny ejectors be rendered operative and we have, therefore, provided the lever 34ᶜ with a rod 45′ overlapping the lever 34ᵇ, and the lever 34ᵇ with a rod 46 overlapping the lever 34ª, and the lever 34ª with a rod 47 overlapping the lever 34, thus a depression of the lever 34ᶜ would cause all four levers to be actuated.

It is also necessary that one of the nickel ejectors be disconnected from the minuend keys to compensate for the penny ejectors which are connected therewith and we have, in the present instance, shown the last nickel ejector as controlled by a short, or supplemental, controlling lever 48 with which is connected one end of a rod 49, the opposite end of which is supported with an arm 50 at the right end side of the machine. This rod is arranged beneath and in the path of the controlling levers for the several penny ejectors, and, consequently, the operation of any of these levers will also operate the supplemental lever 48 and disconnect this nickel ejector from the minuend keys. The two cent sales key acts upon the controlling lever 34ᵇ and through the connecting devices, above described, causes three penny ejectors to be connected with the minuend key. Likewise, the three cent sales key acts upon the controlling lever 34ª and causes two ejectors to be operatively connected with the minuend key and the four cent sales key acts upon the controlling lever 34 and causes a single penny ejector to be connected with the minuend key.

It will be apparent, therefore, that in the event a sale of twenty-one cents is made and the customer tenders a dollar in payment therefor, the operator will depress the twenty cents sales key and the one cent sales key, thus disconnecting the dime ejector and three nickel ejectors, and the four penny ejectors. He will then depress the dollar minuend key with the result that a half dollar, quarter and four pennies will be discharged, which is the correct change for the sale made.

Figure 5:
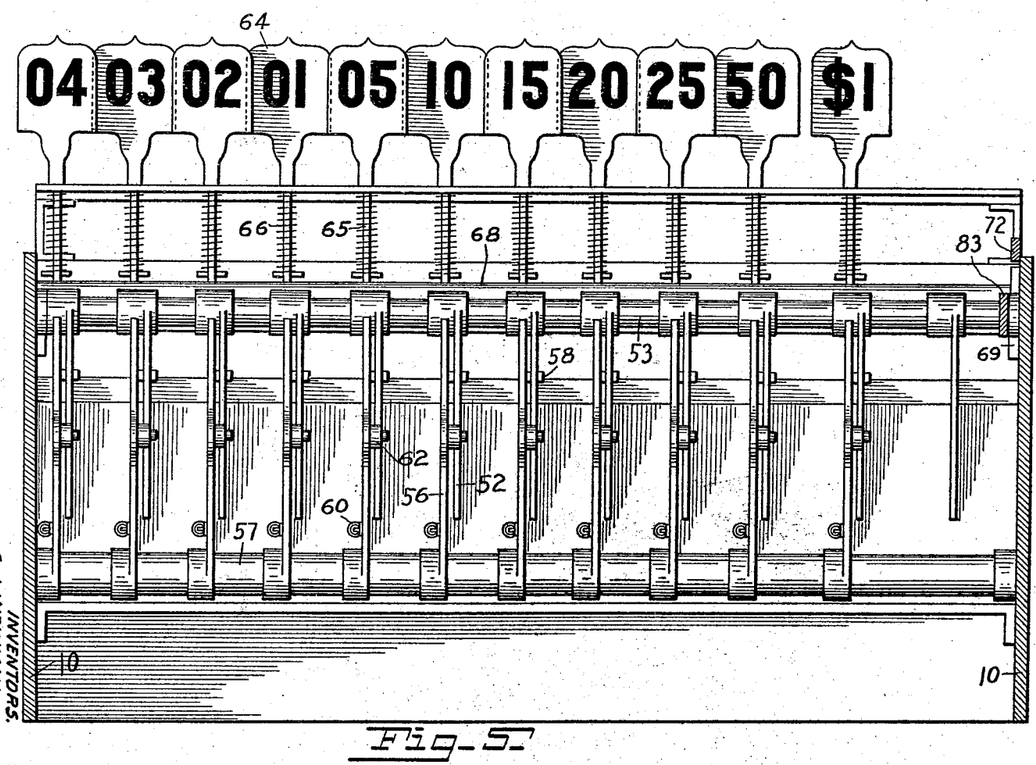
Fig. 5 is a section taken on the line 5—5 of Fig. 3.
Figure 6:
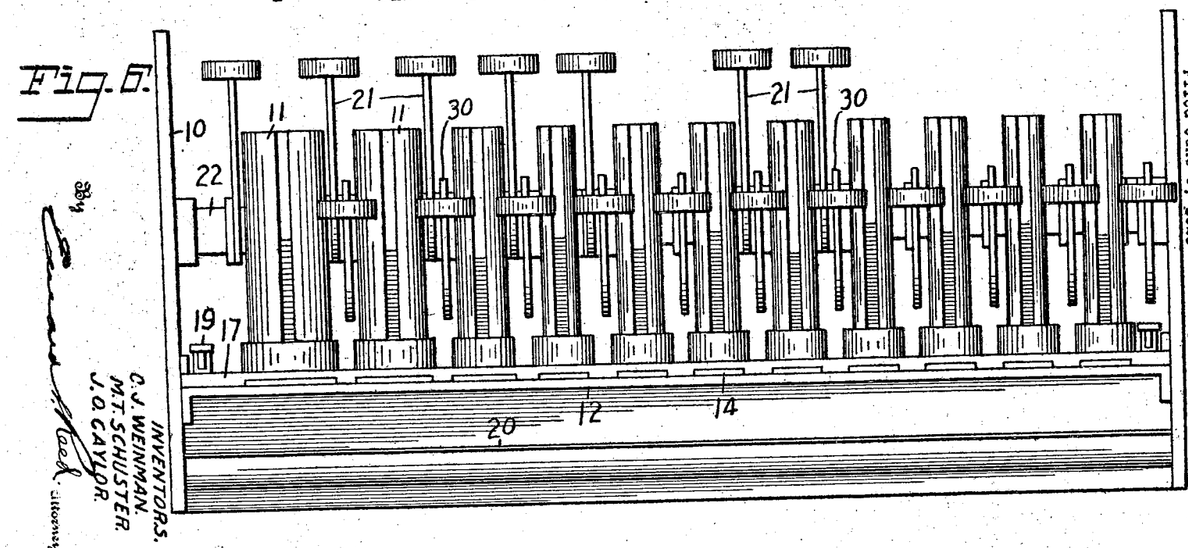
Fig. 6 is a front elevation of the bank of keys.
Figure 7:
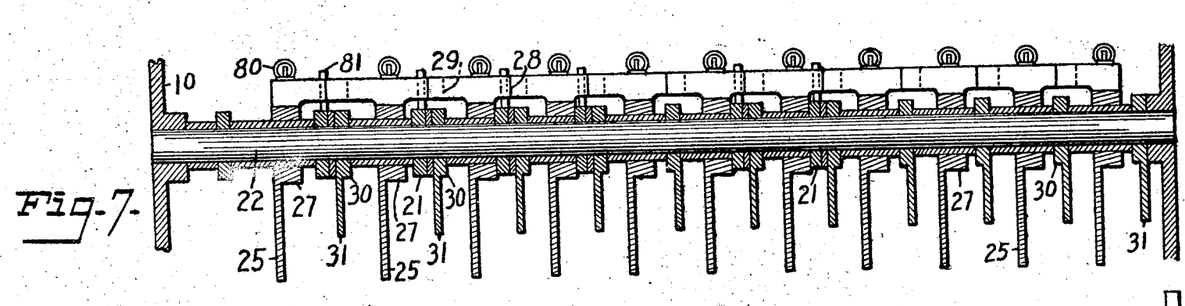
Fig. 7 is a vertical section taken on the line 7—7 of Fig. 3.

In the preferred form of the invention the several minuend keys are locked against operation until one or more of the sales keys has been operated and after it has been operated each sales key is locked in its depressed position until the minuend key has been operated, thus making it necessary to perform the several operations in order and to complete the cycle of operations before the machine can be restored to normal condition. As here shown, each minuend key 21 has its rear end projected some distance beyond the shaft 22 and constituting a stop, or locking member, as shown at 51. Arranged normally in the path of the end 51 of each minuend key is a latch 52, the several latches being mounted upon a shaft 53 and rigidly secured thereto for movement in unison and the shaft being acted upon by a spring 82 connected with an arm 83 (Figs. 3 and 5) carried by the shaft to normally retain the latches in their operative positions. The forward edge of each latch is provided with an upwardly and forwardly curved surface 54. Each sales key also extends rearwardly beyond the shaft 22 and has at its rear end a nose 55 adapted to engage and actuate a releasing arm 56. There is a releasing arm 56 for each sales key and the several arms are mounted on a shaft 57 extending along the rear of the machine. The forward edge of each releasing arm 56 is curved upwardly and forwardly so that as the nose of the sales key rides over the same the arm will be forced rearwardly and a pin 58, in the forward edge thereof, caused to engage the adjacent latch 52 and move the same out of the path of the end of the minuend key, thereby releasing the latter. Inasmuch as the several latches 52 are connected one to the other for movement in unison it will be apparent that the operation of any sales key will release all the minuend keys so that any one of them may be actuated. The curved forward edge of the releasing arm is preferably provided at its upper end with a tooth 59 over which the nose of the sales key will ride in imparting the last movement to the arm and which will then engage beneath the nose to lock the lever in its depressed position, forward movement being imparted to the releasing arm by a spring 60. We also prefer that the curved forward edge of the releasing arm shall be provided with teeth 61 which will prevent the return movement of the sales key before it has made one complete movement. With the sales key locked in its depressed position one of the minuend keys is actuated and the end of the key moving along the curved surface 54 of the latch 52 will force that latch rearwardly and into contact with a projection 62 on the side of the releasing arm 56 and will impart sufficient movement to the releasing arm to move the tooth 59 out of engagement with the nose of the sales key and thereby permit that key to return to its normal position. The minuend key is not locked in its depressed position and is free to return as soon as it is released. The keys may be returned in any suitable manner, but in the present construction we have shown them as provided with weights 63 which serve to restore them to their normal positions.

The machine may also, if desired, be provided with indicators to indicate the amount of the sale made and in the present instance we have provided such indicators in the form of tablets 64, each carried by a bar 65 slidably mounted in suitable guideways in the main frame of the machine and held normally in its lowermost position by a spring 66. These tablets are operatively connected with the respective sales keys and their indications correspond to the value of said sales keys. As here shown, the lower end of each bar 65 rests upon the upper edge of the sales key corresponding thereto so that the operation of this key will elevate the tablet or indicator into a position in which it will be visible, and inasmuch as the sales key is locked in its depressed position the indicator will be locked in its elevated position until the sales key has been released. We prefer, however, that the indication of the last sale made should remain visible after the operation of the machine has been completed and we have, therefore, provided each bar 65 with a projection, or shoulder, 67 adapted to engage the upper edge of a locking bar 68 when the bar 65 has been moved to its elevated position. The bar 68 constitutes a long pawl adapted to engage the projections 67 on all the indicator bars and is here shown as carried by arms 69 pivotally mounted on side members of the frame. Inasmuch as the sales keys are locked in their upper positions it will be apparent that the movement of the bar, or pawl, 68 to permit the elevation of a second indicator will not release the first indicator to be elevated as this indicator will be held in its elevated position by the sales key. We have, therefore, provided means for releasing the elevated indicators upon the operation of a sales key at the beginning of another operation of the machine, that is, after the minuend key has been operated and the first operation of the machine has been completed. To this end the bar, or pawl, 68 has secured thereto a finger 70 having a nose 71 adapted to be engaged by a pawl 72 which is carried by an arm 73 pivotally mounted at 74 in the frame of the machine. A spring 75 acts on the arm 73 and tends to hold the nose of the pawl normally in a position to engage the nose of the finger 70. There is preferably an arm 73 at each end of the machine and extending between the arms 73 is a rod 76 arranged in the paths of the releasing arms 56 so that when one of the releasing arms is moved rearwardly by the depression of the sales key it will engage the rod 76 and cause the pawl 72 to withdraw the locking bar 68, thereby permitting the elevated indicators to drop to their concealed positions. The indicator which has been elevated by the operation of the sales key just mentioned will be retained in that position until the sales key is released and it will not be released by the operation of the minuend key because the releasing arm 56 remains in its rearward position and thus prevents the pawl 72 from engaging the nose of the finger 70 so that the rearward movement imparted to the pawl 72 upon the operation of the minuend key will have no effect upon the locking bar 68. Consequently, the indicators which have been elevated will remain in their exposed positions until a sales key is again operated.

While we have shown and described one embodiment of our invention we wish it to be understood that we do not desire to be limited to the details thereof as various modifications may occur to a person skilled in the art.

Having now fully described our invention what we claim as new and desire to secure by Letters Patent, is:

1. In a device of the character described, a plurality of receptacles, each adapted to contain coins of a single denomination, an ejector for each receptacle, actuating devices for the respective ejectors, an operating member normally connected with a predetermined number of said ejectors and normally disconnected from the remainder of said ejectors, and means under the control of the operator to cause a selected number of said actuating devices to change their operative relation with their respective ejectors to cause different ejectors to be operated by said operating member.

2. In a device of the character described, a plurality of receptacles for coins of various denominations, an ejector for each receptacle, a minuend key adapted to be operatively connected with the ejectors of coin receptacles the total value of which equals the value of the minuend key, and sales keys to control the connections between said minuend key and the several ejectors, whereby the operation of the sales key will cause said minuend key, when operated, to actuate ejectors for coins the total value of which is equal to the value of the minuend key, less the value of the sales key which has been operated.

3. In a device of the character described, a plurality of receptacles for coins of various denominations, an ejector for each receptacle, a minuend key, means for operatively connecting said minuend key with a plurality of said ejectors, and sales keys to control the connections between said minuend key and said ejectors.

4. In a device of the character described, a plurality of receptacles for coins of various denominations, an ejector for each receptacle, a minuend key, means for operatively connecting said minuend key with a plurality of said ejectors, sales keys to control the connections between said minuend key and said ejectors, and means for locking said minuend key against operation until a sales key has been operated.

5. In a device of the character described, a plurality of receptacles for coins of various denominations, an ejector for each receptacle, a minuend key, means for operatively connecting said minuend key with a plurality of said ejectors, sales keys to control the connections between said minuend key and said ejectors, a locking device to hold said minuend key normally against operation, and means controlled by a sales key to actuate said locking device to release said minuend key.

6. In a device of the character described, a plurality of receptacles for coins of various denominations, an ejector for each receptacle, a minuend key, means for operatively connecting said minuend key with a plurality of said ejectors, sales keys to control the connections between said minuend key and said ejectors, a locking device to prevent the return of said sales key to its normal position after it has been operated, and means controlled by said minuend key to actuate said locking device and release said sales key.

7. In a device of the character described, a plurality of receptacles for coins of various denominations, an ejector for each receptacle, a minuend key, means for operatively connecting said minuend key with a plurality of said ejectors, sales keys to control the connections between said minuend key and said ejectors, a device to lock said minuend key normally against operation, means controlled by a sales key to actuate said locking device to release said minuend key, a device to lock said sales key against return movement, and means actuated by said minuend key to release said sales key from said locking device.

8. In a device of the character described, a plurality of coin receptacles, an ejector for each receptacle, a minuend key pivotally mounted and having a portion extending beyond its axis, means for connecting said minuend key with a plurality of said ejectors, a sales key to control the connections between said minuend key and said ejectors, a latch arranged to engage that portion of said minuend key which extends beyond its axis to hold the same against movement, and a releasing device arranged to be engaged by a sales key and to actuate said latch to release said minuend key.

9. In a device of the character described, a plurality of coin receptacles, an ejector for each receptacle, a minuend key pivotally mounted and having a portion extending beyond its axis, means for connecting said minuend key with a plurality of said ejectors, a sales key to control the connections between said minuend key and said ejectors, a latch arranged to engage that portion of said minuend key which extends beyond its axis to hold the same against movement, a releasing device arranged to be engaged by a sales key and to actuate said latch to release said minuend key, a part carried by said releasing device for locking said sales key against return movement, and means actuated by said minuend key for moving said part into inoperative relation to said sales key.

10. In a device of the character described, a plurality of coin receptacles, an ejector for each receptacle, a minuend key pivotally mounted and having a portion extending beyond its axis, means for connecting said minuend key with a plurality of said ejectors, a sales key to control the connections between said minuend key and said ejectors, a pivoted latch having its lower end arranged normally in the path of the end of said minuend key, a releasing arm pivotally mounted at its lower end and arranged to be moved about its axis by the movement of said sales key, said releasing arm having a part arranged to engage said latch and move the same into an inoperative position, and also having a part adapted to engage said sales key and lock the same against return movement, and said latch having a part arranged to be engaged by said minuend key to move said latch about its axis, and a part carried by said releasing arm and arranged in the path of said latch, whereby the operation of said minuend key will move said releasing arm out of engagement with said sales key.

11. In a device of the character described, a plurality of coin receptacles, an ejector for each receptacle, a plurality of minuend keys, means for connecting any one of said keys with a plurality of said ejectors, sales keys to control the connections between said ejectors and said minuend keys, a plurality of latches to lock the respective minuend keys normally against movement, said latches being connected one to the other for movement in unison, separately operable releasing devices arranged for operation by the respective sales keys and each having a part to engage and actuate one of said latches, whereby all of said latches will be moved into an inoperative position.

12. In a device of the character described, a plurality of coin receptacles, an ejector for each receptacle, a plurality of minuend keys, means for connecting any one of said minuend keys with a plurality of said ejectors, sales keys to control the connections between said ejectors and said minuend keys, a plurality of latches to lock the respective minuend keys normally against movement, said latches being connected one to the other for movement in unison, separately operatable releasing devices arranged for operation by the respective sales keys and each having a part to engage and actuate one of said latches whereby all of said latches will be moved into an inoperative position, means for locking said sales keys against return movement, and means operable by any of said minuend keys to release any sales key from its locking device.

13. In a device of the character described, a plurality of coin receptacles, an ejector for each receptacle, actuating devices adapted to be operatively connected with the respective ejectors, an ejecting minuend key operatively connected with a plurality of said actuating devices, and sales keys to control the connections between said actuating devices and the respective ejectors.

14. In a device of the character described, a plurality of coin receptacles, an ejector for each receptacle, a minuend key, a plurality of actuating devices operatively connected with said minuend key, a part of said actuating devices being normally connected with the respective ejectors and a part of said devices being normally disconnected from the respective ejectors, and sales keys to control the connections between said actuating devices and said ejectors.

15. In a device of the character described, a plurality of coin receptacles, an ejector for each receptacle, actuating devices adapted to be operatively connected with the respective ejectors, an ejecting minuend key operatively connected with one of said actuating devices, said actuating devices being so connected one to the other that all of said actuating devices on one side of said minuend key will be operated thereby while those on the other side thereof will not be operated thereby, and sales keys to control the connections between said actuating devices and said ejectors.

16. In a device of the character described, a plurality of receptacles for coins the denominations of which increase from one end of said machine toward the other, an ejector for each of said receptacles, actuating devices for the respective ejectors, said actuating devices being so connected one with the other that any one of said devices may be operated independently of other actuating devices of a higher denomination, but will cause the operation of all actuating devices of a lower denomination, a minuend key operatively connected with one of said actuating devices, and sales keys to control the connections between said actuating devices and the respective ejectors.

17. In a device of the character described, a plurality of coin receptacles, an ejector for each receptacle, actuating devices adapted to be connected with the respective ejectors, each of said actuating devices having projections extending on the opposite sides thereof, one projection of each actuating device overlapping a projection from the adjacent actuating device on one side thereof, and a projection from the other side of the first mentioned actuating device being overlapped by a projection from the actuating device on the opposite side thereof, an ejecting minuend key operatively connected with one of said actuating devices, and sales keys to control the connections between said actuating devices and said ejectors.

18. In a device of the character described, a plurality of coin receptacles, an ejector for each of said receptacles, an actuating device for each ejector, each ejector having a part connected therewith and normally in the path of the corresponding actuating device, an ejecting minuend key operatively connected with a plurality of said actuating devices, and sales keys for moving a selected number of said parts out of the paths of the respective actuating devices.

19. In a device of the character described, a plurality of coin receptacles, an ejector for each receptacle, an actuating device for each ejector, said actuating devices being normally in operative relation with the respective ejectors, a minuend key of predetermined value operatively connected with actuating devices for ejectors for coins the total value of which equals the value of said minuend key, sales keys to interrupt the operative connections between a selected part of said actuating devices and the corresponding ejectors, and means to make it necessary to operate one of said sales keys before said minuend key can be operated.

20. In a device of the character described, a plurality of coin receptacles, an ejector for each receptacle, actuating devices adapted to be operatively connected with the respective ejectors, a minuend key for operating a plurality of said actuating devices, sales keys to control the connections between said actuating devices and the respective ejectors, one of said sales keys being adapted to control the connections between a plurality of said actuating devices and the respective ejectors.

21. In a device of the character described, a plurality of coin receptacles, an ejector for each receptacle, an actuating device adapted to be operatively connected with each ejector, a part of said actuating devices being normally connected with the respective ejectors, and a part of said actuating device being normally disconnected from the respective ejectors, a minuend key to operate a plurality of said actuating devices, and a sales key to disconnect one of the first mentioned actuating devices from its ejector and to connect one of the last mentioned actuating devices with its ejector.

22. In a device of the character described, a plurality of coin receptacles, an ejector for each of said receptacles having a part extending beyond said receptacle, a connecting finger pivotally mounted on said part and movable toward and from the same, a plurality of actuating devices arranged adjacent to the respective parts of said ejectors, means for imparting operative movement to said actuating devices, and means for moving said connecting fingers into or out of the paths of the respective actuating devices.

23. In a device of the character described, a plurality of coin receptacles, an ejector for each receptacle having a part extending beyond the same, a connecting finger pivotally mounted on each of said parts, an actuating device for each of said ejectors, means for imparting movement to said actuating device, a lever to control the position of said connecting finger with relation to said actuating device, and sales keys for actuating the respective controlling levers.

24. In a device of the character described, a plurality of coin receptacles, an ejector for each receptacle, an actuating device for each ejector, means for imparting movement to said actuating devices, a connecting finger pivotally connected with each of said ejectors and movable into and out of the path of one of said actuating devices, levers to control the positions of the respective connecting devices, and sales keys to actuate a selected part of said controlling levers.

25. In a device of the character described, a plurality of coin receptacles, an ejector for each receptacle, an actuating device for each ejector, means for imparting movement to said actuating devices, a connecting finger pivotally connected with each of said ejectors and movable into and out of the path of one of said actuating devices, levers to control the positions of the respective connecting devices, a plurality of pivotally mounted sales keys, each of said keys having a cam shaped portion to engage and actuate one of said controlling levers.

26. In a device of the character described, a plurality of coin receptacles, an ejector for each of said receptacles, an actuating device for each ejector, means for imparting movement to said actuating devices, a connecting finger pivotally connected with each of said ejectors, means for holding said connecting fingers normally in the paths of the respective actuating devices, controlling levers to move said connecting fingers out of the paths of said actuating devices, and sales keys to actuate a selected part of said controlling levers.

27. In a device of the character described, a plurality of coin receptacles, an ejector for each of said receptacles, an actuating device for each ejector, means for imparting movement to said actuating devices, a connecting finger pivotally connected with each of said ejectors, means for holding said connecting fingers normally in the paths of the respective actuating devices, controlling levers to move said connecting fingers out of the paths of said actuating devices, sales keys to actuate a selected part of said controlling levers, and connections between a plurality of said controlling levers whereby the operation of a single sales key will cause a plurality of said connecting fingers to be moved out of the paths of the respective devices.

28. In a device of the character described, a plurality of coin receptacles, an ejector for each receptacle, an actuating device for each ejector, means for imparting movement to said actuating device, a connecting finger pivotally connected with each ejector, means for holding a part of said connecting fingers normally out of the paths of the respective actuating devices, controlling levers acting on the respective connecting fingers to move the same into operative relation with the respective actuating devices, and sales keys to control the operation of said controlling levers.

29. In a device of the character described, a plurality of coin receptacles, an ejector for each receptacle, an actuating device for each ejector, means for imparting movement to said actuating device, a connecting finger pivotally connected with each ejector, means for holding a part of said connecting fingers normally out of the paths of the respective actuating devices, controlling levers acting on the respective connecting fingers to move the same into operative relation with the respective actuating devices, and sales keys to control the operation of said controlling levers, and an operative connection between two of said controlling levers whereby the operation of one of them will cause the operation of the second one, but the second controlling lever may be operated independently of the first controlling lever.

30. In a device of the character described, a plurality of coin receptacles, an ejector for each of said receptacles, an actuating device for each of said ejectors, means for imparting movement to said actuating devices, connecting fingers pivotally connected with each of said ejectors and movable into and out of the paths of the respective actuating devices, means for holding a part of said connecting fingers normally in the paths of their actuating devices, means for holding another part of said connecting fingers out of the paths of their actuating devices, levers for controlling the positions of the respective connecting fingers, sales keys for actuating said controlling levers, and a connection between the controlling levers for the last mentioned group of ejectors and one of the ejectors of the first mentioned group, whereby the movement of the connecting finger of any ejector of the last mentioned group into operative relation to its actuating device will cause the controlling finger of said ejector of the first mentioned group to be moved out of the path of its actuating device.

31. In a device of the character described, a plurality of coin receptacles, an ejector for each receptacle, actuating devices normally connected with a predetermined number of said ejectors and normally disconnected from the remainder of said ejectors, means for imparting movement to said actuating devices, and sales keys for controlling the connection between said actuating devices and said ejectors.

32. In a device of the character described, a plurality of coin receptacles, an ejector for each receptacle, an actuating device for each ejector, a minuend key operatively connected with a plurality of said actuating devices, sales keys to control the connections between said actuating devices and said ejectors.

33. In a device of the character described, a plurality of coin receptacles, an ejector for each receptacle, actuators for said ejectors, each of which represents a monetary value, connecting members interposed between said ejectors and said actuators, selective means for said connecting members, and means controlling said selective means.

34. In a device of the character described, a plurality of coin receptacles, an ejector for each receptacle, actuators for said ejectors, each of which represents a monetary value, connecting members interposed between said ejectors and said actuators and some of which are normally in operative relation with said actuators, and other of which are normally out of operative relation with said actuators, selective means for said connecting members, and means controlling said selective means.

35. In a device of the character described, a plurality of coin receptacles, an ejector for each receptacle, actuators for said ejectors, each of which represents a monetary value, connecting members mounted between said ejectors and said actuators and some of which are normally in operative relation with said actuators and others of which are normally out of operative relation with said actuators, selective means for said connecting members, and means controlling said selective means, said controlling means having monetary values.

36. In a device of the character described, a plurality of coin receptacles, an ejector for each receptacle, a plurality of actuators having overlapping projections, any one of said actuators being adapted to actuate a selected number of ejectors, and selecting means controlling the operative relation between said ejectors and said actuators.

37. In a device of the character described, a plurality of coin receptacles, an ejector for each receptacle, a plurality of actuators, any one of which is adapted to actuate a selected number of ejectors, said actuators consisting of levers and arms, said arms being adapted to move independently of said levers, said arms being provided with overlapping projections, and selecting means controlling the operative relation between said ejectors and said actuators.

38. In a device of the character described, a plurality of coin receptacles, coin discharging means for each receptacle, a definite number of said means being normally operative and others being normally inoperative, and selecting means controlling said discharging means.

39. In a device of the character described, a plurality of coin receptacles, ejectors for said receptacles, actuators for said ejectors, fingers mounted between said ejectors and said actuators and some of which are normally operative and others normally inoperative, and controlling means for said fingers.

40. In a device of the character described, a plurality of coin receptacles, ejectors for said receptacles, actuators for said ejectors, resiliently mounted pivotal fingers between said ejectors and said actuators, some of said fingers being normally operative and others normally inoperative, and controlling means for said fingers in operative relation with the normally operative fingers, on one side of the pivots and in operative relation with the normally inoperative fingers on the opposite side of the pivots.

41. In a device of the character described, coin receptacles, ejectors for said receptacles, interconnected controlling means for said ejectors, said receptacles, ejectors and controlling means being arranged consecutively but with the lowest denomination numbered in a reverse order to the higher denominations.

42. In a device of the character described, coin receptacles, there being a plurality of such receptacles for the coin of the lowest value, ejectors for said receptacles and each of which is differently numbered, controlling means for said ejectors, the lowest numbered controlling means for the coin of the lowest value being adapted to control the next higher controlling means of the same coin, said receptacles, ejectors and controlling means being arranged consecutively but with those of the lower numbers in reverse order to those of the higher denominations.

43. In a device of the character described, coin receptacles, there being a plurality of such receptacles for the coin of the lowest value, ejectors for said receptacles, each of which has a different number, said ejectors consisting of slides and actuators, controlling means for said ejectors, the controlling means of the lowest numbered of the lowest coin provided with projections which overhang and control the controlling means of the next higher controlling means of the same coin, said receptacles, ejectors and controlling means being arranged consecutively but with the lowest denomination numbered in a reverse order to the higher denominations, and the slides of the lowest denomination being normally out of operative relation with their actuators.

44. In a device of the character described, coin receptacles, there being a plurality of such receptacles for the coin of the lowest value, ejectors consisting of slides, pivoted fingers and actuators for said receptacles, each of said ejectors having a different number, controlling means for said ejectors, the controlling means of the lowest numbered of the lowest coin provided with projections which overhang and control the controlling means of the next higher controlling means of the same coin, said receptacles, ejectors and controlling means being arranged consecutively but with the lower numbers in a reverse order to the higher denominations, and the controlling means for the lower numbers being in operative relation with their respective fingers on one side of their pivot while the controlling means for the higher denominations are in operative relation with their respective fingers on the opposite side of the pivots.

In testimony whereof, we affix our signatures hereto.

CHRISTIAN J. WEINMAN.
MARK T. SCHUSTER.
JAMES O. CAYLOR.